(12) United States Patent
Yang et al.

(10) Patent No.: US 10,855,444 B2
(45) Date of Patent: Dec. 1, 2020

(54) QOS ASSISTED AES ENGINE FOR SSD CONTROLLER

(71) Applicant: PetalO Inc., Santa Clara, CA (US)

(72) Inventors: Fan Yang, Fremont, CA (US); Aditi Rema Ganesan, San Jose, CA (US)

(73) Assignee: PETAIO INC., Santa Clara, CA (US)

( * ) Notice: Subject to any disclaimer, the term of this patent is extended or adjusted under 35 U.S.C. 154(b) by 220 days.

(21) Appl. No.: 16/169,433

(22) Filed: Oct. 24, 2018

(65) Prior Publication Data

US 2020/0136802 A1    Apr. 30, 2020

(51) Int. Cl.
*H04L 29/06* (2006.01)
*H04L 9/06* (2006.01)
*H04L 9/08* (2006.01)
*H04L 9/14* (2006.01)

(52) U.S. Cl.
CPC .......... *H04L 9/0631* (2013.01); *H04L 9/0861* (2013.01); *H04L 9/14* (2013.01); *H04L 63/06* (2013.01); *H04L 2209/12* (2013.01); *H04L 2209/24* (2013.01)

(58) Field of Classification Search
CPC . H04L 2209/12; H04L 2209/24; H04L 63/06; H04L 9/0631; H04L 9/0861; H04L 9/14
See application file for complete search history.

(56) References Cited

U.S. PATENT DOCUMENTS

| 2012/0042060 A1* | 2/2012 | Jackowski | H04L 47/2475 709/224 |
| 2019/0123894 A1* | 4/2019 | Yuan | H04L 9/0894 |
| 2019/0199526 A1* | 6/2019 | Sugahara | H04L 9/003 |

* cited by examiner

*Primary Examiner* — Joseph P Hirl
*Assistant Examiner* — Ka Shan Choy
(74) *Attorney, Agent, or Firm* — David R. Stevens; Stevens Law Group

(57) ABSTRACT

A flow controller selects a direction (encryption/decryption) for an AES core according to quality of service parameters and a number of data words in encryption and decryption data buffers. A direction ratio may be calculated as a function of the quality of service parameters and the number of data words in the encryption and decryption data buffers. The flow controller selects the direction to reduce a cost function. The cost function may be at a minimum when a ratio of words in the encryption and decryption data buffers is the same as the direction ratio. A key management unit supplies keys according to the selected direction to the AES cores. Multiple AES cores may be used.

20 Claims, 4 Drawing Sheets

QOS ASSISTED AES ENGINE FOR SSD CONTROLLER

BACKGROUND

Field of the Invention

This invention relates to systems and methods for encrypting data in a solid state drive (SSD).

Background of the Invention

The "block cipher" is widely used in hard disk encryption. Different operation modes (ECB, CBC, OFB, and CFB) were specified in FIPS81 which was released 1981, including the DES mode of operation. In 2001, NIST included AES as a block cipher and XTS mode was added in 2010. XTS-AES is widely used in SSD controllers for data encryption and decryption. To reduce the hardware gate count, a common approach is to use one AES computation core for both encryption and decryption paths.

Background information regarding implementations for AES are discussed in the following documents which are hereby incorporated herein by reference in their entirety: "Advanced Encryption Standard (AES)" Federal Information Processing Standards. US National Institute of Standards and Technology. 26 Nov. 2001; "Recommendation for Block Cipher Modes of Operation: The XTS-AES Mode for Confidentiality on Storage Devices", NIST Special Publication 800-38E, National Institute of Standards and Technology, January 2010.

It would be an advancement in the art to improve the operation of an AES computation core.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
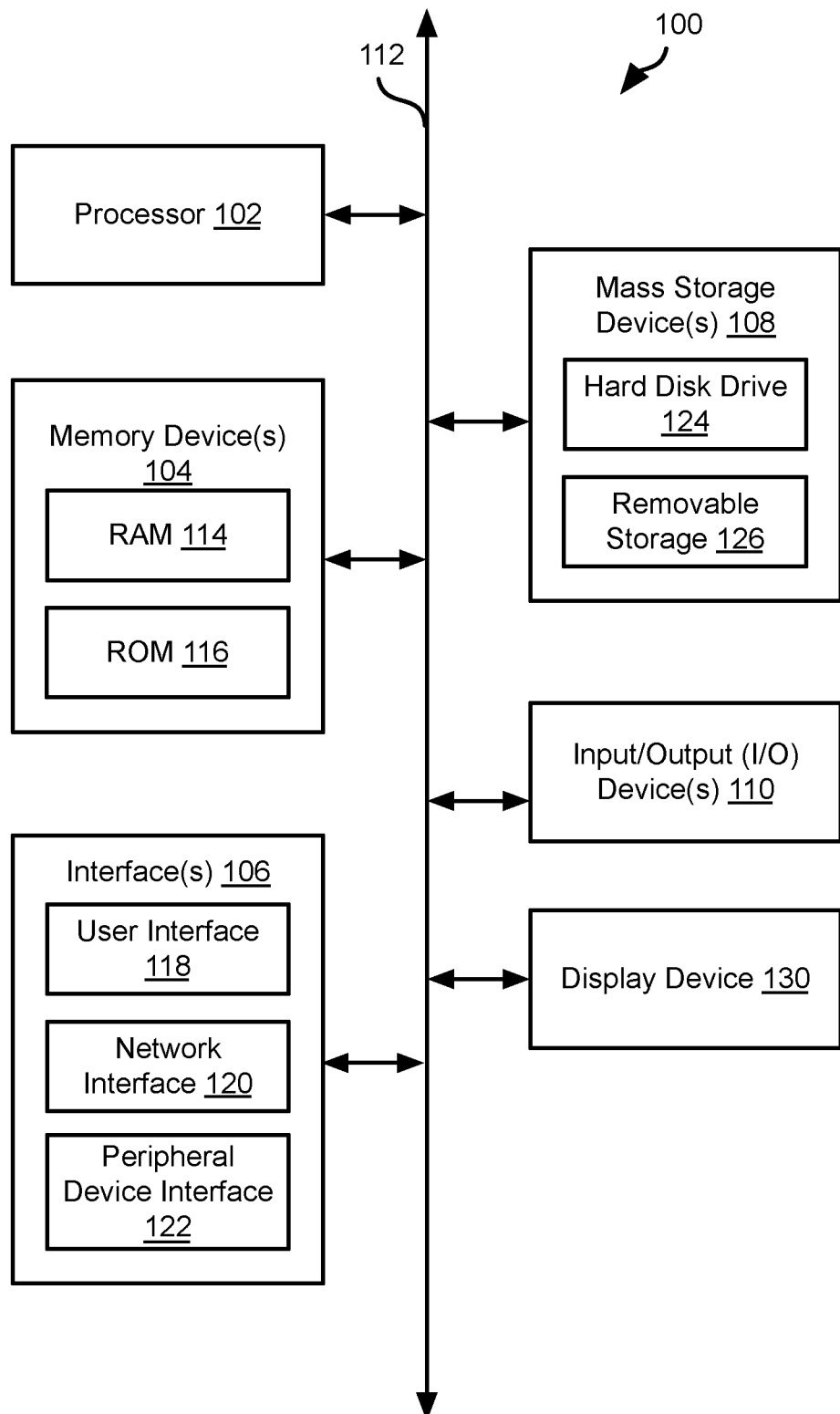
FIG. 1 is a schematic block diagram of a computing system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116. memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
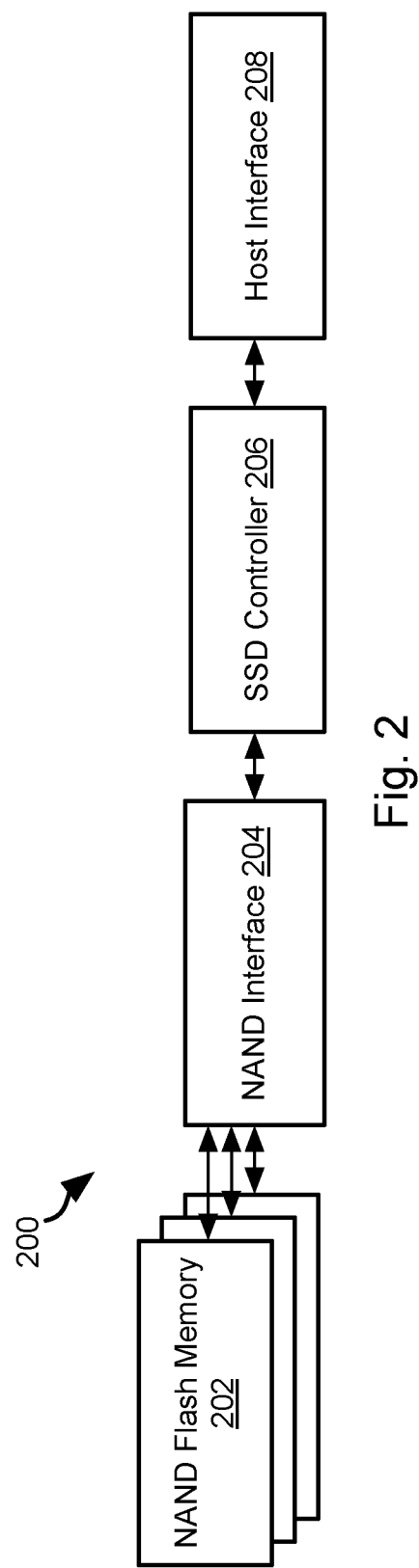
FIG. 2 is a schematic block diagram of components of a storage system in accordance with the prior art.

Referring to FIG. 2, a typically flash storage system 200 includes a solid state drive (SSD) that may include a plurality of NAND flash memory devices 202. One or more NAND devices 202 may interface with a NAND interface 204 that interacts with an SSD controller 206. The SSD controller 206 may receive read and write instructions from a host interface 208 implemented on or for a host device, such as a device including some or all of the attributes of the computing device 100. The host interface 208 may be a data bus, memory controller, or other components of an input/output system of a computing device, such as the computing device 100 of FIG. 1.

The methods described below may be performed by the host, e.g. the host interface 208 alone or in combination with the SSD controller 206. The methods described below may be used in a flash storage system 200, hard disk drive (HDD), or any other type of non-volatile storage device. The methods described herein may be executed by any component in such a storage device or be performed completely or partially by a host processor coupled to the storage device.

Figure 3:
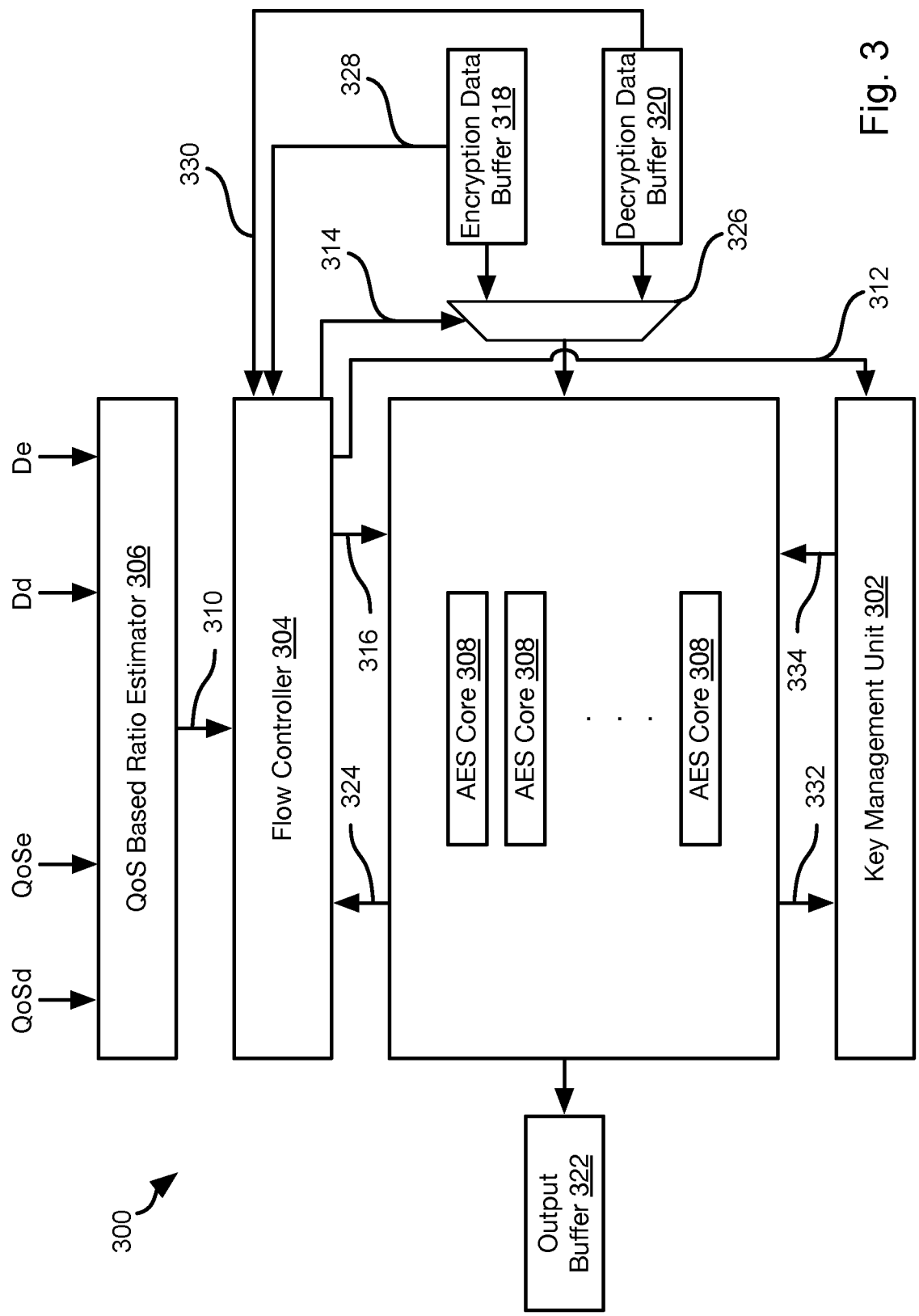
FIG. 3 is a schematic block diagram of a QoS assisted AES engine in accordance with an embodiment of the present invention.

FIG. 3 illustrates an improved AES engine 300 that accounts for a quality of service (QoS) requirements. In a conventional approach to AES (Advanced Encryption Standard) encryption, the same hardware is used for both encryption and decryption. In the conventional approach, extra cycles are required to handle the AES key expansion when switching direction between encryption and decryption, which degrades the disk input and output latency. This is particularly problematic for data center applications where latency is a critical parameter.

The disclosed AES engine 300 implements a method that uses QoS information together with a key management unit 302 and flow controller 304 that effectively remove the overhead caused by the direction switch and the change of logic block. During direction switch and logical block (512 bytes or 4K bytes) change, a new round key needs to be derived. Based on key size, it may take up to 14 processing cycles. By using information from the flow controller 304, the round keys are derived in a previous AES processing cycle and stored in key memory. After direction switch and logic block change, the round keys are loaded from key memory directly, which removing the processing overhead. For example; the AES engine 300 may include a QoS based ratio estimator 306 and one or more AES cores 308, such as three or more AES cores 308.

The QoS based ratio estimator 306 provides a direction ratio 310 to the flow controller 304. Based on this direction ratio 310, the flow controller 304 generates a key management control signal 312, a multiplexer select signal 314, and a start signal 316.

Each AES core 308 loads data from an encryption data buffer 318 or decryption data buffer 320 after receiving the start signal 316 from the flow controller. Each AES core 308 may receive its own start signal from the flow controller 304. Once done processing, data is sent to an output buffer 322 and the AES core 308 generates a done signal 324 to the flow controller 304. The multiplexer select signal 314 is input to a multiplexer 326 that selects which of the buffers 318, 320 will be used to load data into each AES core 308.

The details of each module are described in the following sections.

QoS Based Ratio Estimator

The QoS based ratio estimator 306 takes inputs from a controller, such as the SSD controller 206 or the host interface 206, which inputs may include such values as a QoS, a number of pending data words for encryption ($D_e$), and number of pending data words for decryption ($D_e$). The QoS may include an encryption QoS ($QoS_e$) and a decryption QoS ($QoS_d$), which may be equal or unequal.

The QoS based ratio estimator may select the direction ratio 310 as a function of the QoS ($QoS_e$, $QoS_d$) and the pending data words ($D_e$, $D_d$). For example, the direction ratio 310 may be calculated according to (1), where $W_{e0}$, $W_{e1}$, $W_{d0}$ and $W_{d1}$ are configurable parameters and $C_e$ and $C_d$ are configurable upper limits.

$$\text{Direction Ratio} = \frac{\min(W_{e0} * QoS_e + W_{e1} * D_e, C_e)}{\min(W_{d0} * QoS_d + W_{d1} * D_d, C_d)} \quad (1)$$

As is apparent, (1) increases with increase in $QoS_e$ and $D_e$ decreases with increase in $QoS_d$ and $D_d$ subject to the constraints of the upper limits $C_e$ and $C_d$. The $W_{e0}$, $W_{e1}$, $W_{d0}$ and $W_{d1}$ enable a particular term by which they are multiplied to have a greater impact on the direction ratio, i.e., increasing a weight will cause the term by which it is multiplied to have a greater impact on the direction ratio 310.

As is also apparent $D_e$ and $D_d$ are not static values and therefore the value of the direction ratio 310 can vary in accordance with $D_e$ and $D_d$. The QoS based ratio estimator may therefore periodically recalculate the direction ratio 310, such as every logic block.

Flow Controller

The flow controller 304 may further take as inputs request signals 328, 330 from the encryption data buffer 318 and the decryption data buffer 320, respectively. In particular, each buffer 318, 320 may generate its corresponding request signal 328, 330 if at least one data word remains to be processed in the buffer 318, 320, respectively.

Figure 4:
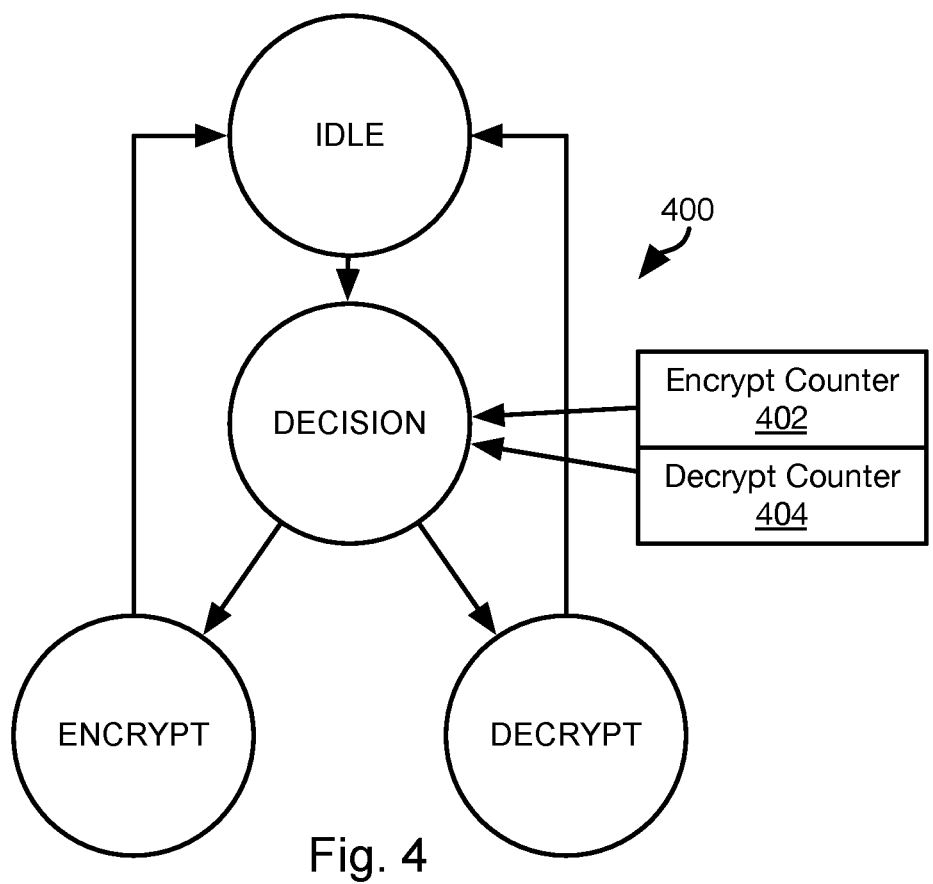
FIG. 4 is a schematic block diagram of a state machine for the QoS assisted AES engine in accordance with an embodiment of the present invention.

Referring to FIG. 4, the flow controller 304 may be implemented as a state machine 400 that changes state in response to the direction ratio 310, the request signals 328, 330 and the done signal 324.

In the illustrated embodiment, the state machine 400 has the following states IDLE, DECISION, ENCRYPT, DECRYPT. The state machine 400 changes from IDLE to DECISION after receiving the request signal 328, 330 from either of the data buffers 318, 320. The flow controller 304 may include or access two counters 402, 404 to track the number of AES operations, one for encryption and the other for decryption. In some embodiments, the buffer 318 or some other component increments the counter 402 for each data word added to the encryption buffer 318. Likewise, the buffer 320 or some other component increments the counter 404 for each data word added to the decryption buffer 320. The counters are reset to 0 if one of the data buffers is empty. Each time a word is removed from a buffer 318, 320 to be processed by an AES core, the corresponding counter 402, 404 is decremented by the buffer 318, 320, respectively, or some other component. In some embodiments, the values of $D_e$ is defined as the value stored in the counter 402 and the value of $D_d$ is defined as the value stored in the counter 404.

At the DECISION state, the state machine 400 checks both request signals 328, 330. If only one request 328, 330 is asserted, the state machine chooses the direction according to the request 328, 330 is asserted. If request 328 is asserted and request 330 is not, then the flow controller 304 goes to the ENCRYPT state. The multiplexer select signal 314 will therefore cause the multiplexer 326 to couple the encryption data buffer 318 to an AES core 308, which will then remove a data word from the buffer 318, encrypt the data word, and write a result of the encryption to the output buffer 322.

If request 330 is asserted and request 328 is not, then the flow controller 304 goes to the DECRYPT state. The multiplexer select signal 314 will therefore cause the multiplexer 326 to couple the decryption data buffer 320 to an AES core 308, which will then remove a data word from the buffer 320, decrypt the data word, and write the result of the decryption to the output buffer 322.

If both requests 328, 330 are asserted, the state machine 400 checks the two counters 402 and 404 and makes the decision based on a cost function based on the direction ratio 310. For example, the cost function may be according to (2), where Encrypt Count is the value stored in counter 402 and Decrypt Count is the value stored in counter 404.

$$\min\|\text{Direction Ratio} - \text{Encrypt Count}/\text{Decrypt Count}\| \quad (2)$$

In particular, the state machine 400 will select between the ENCRYPT and DECRYPT state effective to reduce the value of the cost function (2). In particular, if decrementing Encrypt Count will reduce the cost function, then the state machine 400 will select the ENCRYPT state. If decrementing Decrypt Count will reduce the cost function, then the state machine 400 will select the DECRYPTE state.

As is apparent, the direction ratio 310 specifies the ratio of Encrypt Count to Decrypt Count at which the cost function (2) is at a minimum. Accordingly, if Decrypt Count is greater than one, the cost function (2) is at a minimum when Encrypt Count is greater than Decrypt count in the ratio specified by Decrypt Count. Accordingly, when the direction ratio 310 is greater than one, the number of data words waiting to be encrypted is larger than the number of data words waiting to be decrypted at the minimum of the cost function (2) thereby prioritizing encryption and increasing the probability that data words will be selected from the encryption data buffer 318. When the direction ratio 310 is less than one, the number of data words waiting to be decrypted is larger than the number of data words waiting to be encrypted at the minimum of the cost function (2) thereby prioritizing decryption and increasing the probability that data words will be selected from the decryption data buffer 320. This approach limits the number of direction changes and enables biasing toward a particular direction based on backlog and a QoS.

As shown above, the direction ratio 310 may be calculated according to (1), which is also a function of Encrypt Count ($D_e$) and Decrypt Count ($D_d$). Accordingly, the value of the direction ratio 310 is adjusted according to (2) to according to an imbalance between Encrypt Count and Decrypt count, subject to the other parameters of (2) ($QoS_e$, $QoS_d$, $W_{e0}$, $W_{e1}$, $W_{d0}$ and $W_{d1}$).

After a decision (ENCRYPT or DECRYPT) is made, the flow controller sends the key management control signal 312 to the key management unit 302 to select the correct AES key for the state selected (encryption key for ENCRYPT and decryption key for DECRYPT) and moves to the next stage according to the decision. At the DECRYPT and ENCRYPT stage of the state machine 400, the flow controller 304 issues the start signal 316 to the AES core 308. After receiving the done signal 324 from the AES core 308, the state machine 400 returns to IDLE.

Key Management Unit

Referring to FIG. 3, the key management unit 302 receives the key management control 312 and takes as a further input a load signal 332 from the AES core 308. The key management unit 302 provides a round key signal 334 as an output to the AES core 308.

Figure 5:
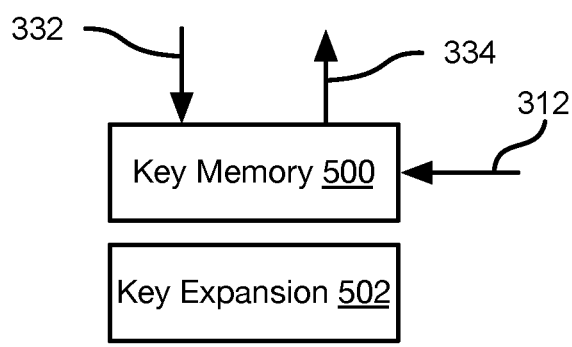
FIG. 5 is a schematic block diagram of a key management unit for the QoS assisted AES engine in accordance with an embodiment of the present invention.

Referring to FIG. 5, the key management unit 302 may include two components, key memory 500 and a key expansion unit 502. At an initial stage, the key expansion unit 502 generates the current and next round keys and stores them in the key memory 500. During the operation (encrypt/decrypt), the key management unit 302 gets control from the flow controller 304 and selects round keys from key memory 500 for the AES core 308 and provides them as the round key signal 334 to the AES core in response to a load signal 332 from the AES core 308. When the direction for an operation is encryption as determined by the flow controller 304, the round keys will be those for performing encryption. When the direction for an operation is decryption as determined by the flow controller 304, the round keys will be those for performing decryption.

AES Core

The AES core 308 reads data from the input buffer 318, 320 selected by the multiplexer 326 according to the multiplexer select signal 314. After receiving the start signal 316 from the flow controller 304, the AES core 308 loads the processed key from key memory 500 and process data as described in AES algorithm as known in the art. After processing is done, the AES core 308 stores the result of the processing to the output buffer 322 and asserts the done signal 324, which triggers system logic to read data from the output buffer 322 and store it to system memory.

Multiple AES cores 308 can be used, which depends on the system bandwidth requirements. For example, the flow controller 304 may select a direction (ENCRYPT/DECRYPT) for each AES core 308 and invoke processing a data word from the selected buffer 318, 320 in response to the each AES core 308 asserts its done signal 324. In another example, a state machine according to FIG. 4 may be implemented for each AES core. In this manner, any number of AES cores 308 may be selected when they are available in the same manner as described above. In some embodiments, all AES cores use the same AES key and start and stop at the same time. In some embodiments, the number of AES core is limited by the logical block size (e.g., 128 bit) inasmuch as the AES key is different for each logic block.

The present invention may be embodied in other specific forms without departing from its spirit or essential characteristics. The described embodiments are to be considered in all respects only as illustrative, and not restrictive. In particular, although the methods are described with respect to a NAND flash SSD, other SSD devices or non-volatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

What is claimed is:

1. An apparatus comprising:
one or more encryption cores each being an Advanced Encryption Standard (AES) core configured to operate as both an encryptor and a decryptor;
an encryption data buffer;
a decryption data buffer; and
a flow controller configured to invoke retrieval of a plurality of data words for processing from the encryption data buffer and the decryption data buffer and submit each data word to a selected encryption core of the one or more encryption cores, the flow controller further configured to select between the encryption data buffer and the decryption data buffer according to a quality of service parameter such that a probability of retrieving each data word of the plurality of data words from the encryption data buffer is different from a probability of retrieving the data for processing from the decryption data buffer in accordance with the quality of service parameter;
wherein the flow controller is further configured to, (i) when the encryption data buffer is selected, remove a first word of the plurality of data words from the encryption data buffer and load the first word into the selected encryption core and (ii) when the decryption data buffer is selected, remove a second word of the plurality of data words from the decryption data buffer and load the second word into the selected encryption core.

2. The apparatus of claim 1, wherein the flow controller is further configured to:
select each data word of the plurality of data words from one of the encryption data buffer and the decryption data buffer such that a ratio of data words of the plurality of data words remaining in the encryption data buffer ($D_e$) and data words of the plurality of data words remaining in the decryption data buffer ($D_d$) is closer to a direction ratio as a result of selection of the each data word, the direction ratio being a function of the quality of service parameter.

3. The apparatus of claim 2, wherein the direction ratio is a function of the quality of service parameter and $D_e$ and $D_d$.

4. The apparatus of claim 3, further comprising a ratio estimator configured to calculate the direction ratio according to:

$$\frac{\min(W_{e0} * QoS_e + W_{e1} * D_e, C_e)}{\min(W_{d0} * QoS_d + W_{d1} * D_d, C_d)}$$

wherein:
$W_{e0}$, $W_{e1}$, $W_{d0}$ and $W_{d1}$ are predefined weights;
$QoS_e$ is an encryption component of the quality of service parameter;
$QoS_d$ is a decryption component of the quality of service parameter; and
$C_e$ and $C_d$ are predefined upper limits.

5. The apparatus of claim 2, wherein the flow controller is further configured to select each data word of the plurality of data words from one of the encryption data buffer and the decryption data buffer to achieve a reduction in a cost function, the cost function being:

$$\min \| \text{direction ratio} - D_e/D_d \|.$$

6. The apparatus of claim 1, further comprising a key management unit configured to, for each data ford of the plurality of data words:
when the flow controller selects the encryption data buffer for retrieval of the each data word, load encryption data into an encryption core of the one or more encryption cores;
when the flow controller selects the decryption data buffer for retrieval of the each data word, load decryption data into the encryption core of the one or more encryption cores.

7. The apparatus of claim 6, wherein the one or more encryption cores include a plurality of encryption cores.

8. The apparatus of claim 7, wherein the one or more encryption cores are Advanced Encryption Standard (AES) encryption cores.

9. The apparatus of claim 7, wherein the key management unit comprises a key memory and a key expansion unit, the key expansion unit configured to generate round keys and store the round keys in the key memory, the key management unit further configured to load the round keys from the key memory into the AES encryption cores in response to an instruction from the flow controller.

10. The apparatus of claim 1, wherein the flow controller is further configured to:
when only the encryption data buffer stores one or more data words of the plurality of data words, retrieve the each data word from the encryption data buffer without regard to the quality of service parameter; and
when only the decryption data buffer stores one or more data words of the plurality of data words, retrieve the each data word from the decryption data buffer without regard to the quality of service parameter.

11. A method comprising:
providing an encryption core that is an Advanced Encryption Standard (AES) core configured to operate as both an encryptor and a decryptor;
receiving a plurality of first data words;
storing the plurality of first data words in an encryption data buffer;
receiving a plurality of second data words;
storing the plurality of second data words in a decryption data buffer;
(a) selecting a selected direction according to a quality of service parameter, the selected direction being one of encryption and decryption, such that a probability of selection of decryption is different from a probability of selection of encryption in accordance with the quality of service parameter;
(b) configuring the encryption core to operate according to the selected direction;
(c) (i) when the selected direction is encryption, removing a first word of the plurality of first words from the encryption data buffer and load the first word into the encryption core and (ii) when the selected direction is decryption, removing a second word of the plurality of second words from the decryption data buffer and load the second word into the encryption core;
(d) executing an operation according to the selected direction by the encryption core; and
(e) writing, by the encryption core, a result of the operation to an output buffer.

12. The method of claim 11, wherein (a) comprises selecting the selected direction such that a ratio of a number of the plurality of first data words remaining in the encryption data buffer ($D_e$) to a number of the plurality of second data words remaining in the decryption data buffer ($D_d$) will be closer to a direction ratio as a result of performing (c) according to the selected direction, the direction ratio being a function of the quality of service parameter.

13. The method of claim 12, further comprising calculating the direction ratio as a function of the quality of service parameter and $D_e$ and $D_d$.

14. The method of claim 13, further comprising calculating the direction ratio according to:

$$\frac{\min(W_{e0} * QoS_e + W_{e1} * D_e, C_e)}{\min(W_{d0} * QoS_d + W_{d1} * D_d, C_d)}$$

wherein:
$W_{e0}$, $W_{e1}$, $W_{d0}$ and $W_{d1}$ are predefined weights;
$QoS_e$ is an encryption component of the quality of service parameter;
$QoS_d$ is a decryption component of the quality of service parameter; and
$C_e$ and $C_d$ are predefined upper limits.

15. The method of claim 12, further comprising selecting the selected direction such that performing (c) will reduce a cost function, the cost function being $$\min \| \text{direction ratio} - D_e/D_d \|.$$

16. The method of claim 11, further comprising:
when the selected direction is encryption, load encryption data into the encryption core;
when the selected direction is decryption, load decryption data into the encryption core.

17. The method of claim 11, wherein the operation is Advanced Encryption Standard (AES) encryption when the selected direction is encryption and wherein the operation is AES decryption when the selected direction is decryption.

18. The method of claim 17, further comprising:
calculating a plurality of round keys according to AES and storing the plurality of round keys in a memory;
loading a portion of the plurality of round keys from the memory into the encryption core prior to performing (d).

19. The method of claim 11, further comprising:
when only the encryption data buffer stores one or more data words of the plurality of data words, selecting encryption as the selected direction without regard to the quality of service parameter;

when only the decryption data buffer stores one or more data words of the plurality of data words, selecting decryption as the selected direction without regard to the quality of service parameter.

20. The method of claim 11, further comprising at least one of:

writing contents of the output buffer to a solid state memory device; and providing the contents of the output buffer to a host device.

\* \* \* \* \*